(12) United States Patent
Kellner et al.

(10) Patent No.: US 10,210,149 B2
(45) Date of Patent: Feb. 19, 2019

(54) PERSONALIZED WIKI-BOOK ANNOTATION

(71) Applicant: CA, Inc., Islandia, NY (US)

(72) Inventors: Charles B. Kellner, Prague (CZ); Michael Platt, Prague (CZ); Pavel Škopík, Louka (CZ)

(73) Assignee: CA, Inc., New York, NY (US)

( * ) Notice: Subject to any disclaimer, the term of this patent is extended or adjusted under 35 U.S.C. 154(b) by 764 days.

(21) Appl. No.: 14/341,913

(22) Filed: Jul. 28, 2014

(65) Prior Publication Data

US 2016/0026615 A1  Jan. 28, 2016

(51) Int. Cl.
| | | |
|---|---|---|
| G06F 17/22 | (2006.01) | |
| G06F 17/24 | (2006.01) | |
| G06F 17/30 | (2006.01) | |
| G06Q 10/10 | (2012.01) | |

(52) U.S. Cl.
CPC ........ *G06F 17/241* (2013.01); *G06F 17/2288* (2013.01); *G06F 17/3089* (2013.01); *G06Q 10/101* (2013.01)

(58) Field of Classification Search
CPC .... G06F 17/221; G06F 17/228; G06F 17/241; G06F 17/3089
USPC ......................................... 715/200, 229, 230
See application file for complete search history.

(56) References Cited

U.S. PATENT DOCUMENTS

| | | | | |
|---|---|---|---|---|
| 7,392,471 B1* | 6/2008 | Ford | .................... | G06F 17/2211 715/229 |
| 7,587,412 B2* | 9/2009 | Weyl | ....................... | G06Q 30/00 |
| 7,769,772 B2* | 8/2010 | Weyl | ................. | G06F 17/30253 382/154 |
| 9,047,261 B2* | 6/2015 | Bowling | ............. | G06F 17/2247 |
| 9,075,779 B2* | 7/2015 | King | ........................ | G06K 9/228 |
| 9,195,965 B2* | 11/2015 | Sitrick | ................. | G06Q 10/101 |
| 2009/0083314 A1* | 3/2009 | Maim | ................. | G06F 17/2211 |
| 2011/0029443 A1* | 2/2011 | King | ...................... | G06K 9/228 705/310 |
| 2013/0024418 A1* | 1/2013 | Sitrick | ................. | G06Q 10/101 707/608 |
| 2013/0275849 A1* | 10/2013 | King | ...................... | G06K 9/228 715/229 |

(Continued)

OTHER PUBLICATIONS

Heintzelman, Chuck; "Creating HTML Macros"; http://web.archive.org/web/20140625071904/http://laravel-recipes.com/recipes/181; Jun. 25, 2014, pp. 1-2.

(Continued)

*Primary Examiner* — Stephen S Hong
*Assistant Examiner* — Ahamed I Nazar
(74) *Attorney, Agent, or Firm* — Meyertons, Hood, Kivlin, Kowert & Goetzel, P.C.

(57) ABSTRACT

Assembling customized documentation includes storing annotations to an original version of a document and receiving a new version of the document, wherein the new version of the document is different than the original version of the document. The assembling further includes storing an updated version of the document based on differences between the original version and the new version of the document; and associating the annotations with the updated version of the document, wherein the associated annotations and the updated version of the document form a personalized version of the document.

13 Claims, 4 Drawing Sheets

(56) References Cited

U.S. PATENT DOCUMENTS

2014/0032513 A1* 1/2014 Gaither ............. G06F 17/30985
　　　　　　　　　　　　　　　　　　707/698
2014/0215302 A1* 7/2014 Little ................ G06F 17/30893
　　　　　　　　　　　　　　　　　　715/229

OTHER PUBLICATIONS

Sokolov, Michael; HTML::Macro module; http://search.cpan.org/~sokolov/HTML-Macro.1-19/Macro.pm; 2002, pp. 1-3.

* cited by examiner

US 10,210,149 B2

PERSONALIZED WIKI-BOOK ANNOTATION

BACKGROUND

The present disclosure relates to wiki-books and, more specifically, to annotated wiki-books.

Wiki software, which can also be referred to as a wiki engine or a wiki application, is collaborative software that runs a wiki, i.e., a website that allows users to create and collaboratively edit web pages via a web browser. A wiki system is usually a web application that runs on one or more web servers. The content, including all current and previous revisions, is usually stored in either a file system or a database. Wikis can be considered a type of web content management system. There are dozens of wiki engines, in a variety of programming languages and vary widely in their platform support, their support for natural language characters and conventions, and in their assumptions about technical versus social control of editing.

There are essentially three types of usage for wiki software: public-facing wikis with a potentially large community of readers and editors, private enterprise wikis for data management by corporations and other organizations, and personal wikis, meant to be used by a single person to manage notes, and usually run on a desktop. Some wiki software is specifically geared for one of the usage types, while other software can be used for all three, but contains functionality, either in its core or through plugins, that help with one or more of the usage types.

Enterprise wiki software is software meant to be used in a corporate (or organizational) context, especially to enhance internal knowledge sharing. It tends to have a greater emphasis on features like access control, integration with other software, and document management. Some proprietary wiki applications, such as for example Confluence, are marketed as enterprise wiki software.

Within organizations, wikis may be used to either add to or replace centrally managed content management systems. Their decentralized nature allows them, in principle, to disseminate needed information across an organization more rapidly and more cheaply than a centrally controlled knowledge repository. Wikis can also be used for document management, project management, customer relationship management, enterprise resource planning, and many other kinds of data management.

BRIEF SUMMARY

According to one aspect of the present disclosure, a method for assembling customized documentation includes storing, by a computer, annotations to an original version of a document; and receiving, by the computer, a new version of the document, wherein the new version of the document is different than the original version of the document. The method further includes storing, by the computer, an updated version of the document based on differences between the original version and the new version of the document; and associating, by the computer, the annotations with the updated version of the document, wherein the associated annotations and the updated version of the document form a personalized version of the document.

According to another aspect of the present disclosure, a system for assembling customized documentation includes a memory storage device; and a processor configured to execute instructions stored in the memory storage device. The instructions when executed by the processor cause the system to store annotations to an original version of a document; and to receive a new version of the document, wherein the new version of the document is different than the original version of the document. When executed, the instructions also cause the system to store an updated version of the document based on differences between the original version and the new version of the document; and associate the annotations with the updated version of the document, wherein the associated annotations and the updated version of the document form a personalized version of the document.

According to another aspect of the present disclosure, a computer program product for assembling customized documentation includes a non-transitory computer readable storage medium having computer readable program code embodied therewith. The computer readable program code includes computer readable program code for storing annotations to an original version of a document; and computer readable program code for receiving a new version of the document, wherein the new version of the document is different than the original version of the document. The computer readable code also includes computer readable program code for storing an updated version of the document based on differences between the original version and the new version of the document; and computer readable program code for associating the annotations with the updated version of the document, wherein the associated annotations and the updated version of the document form a personalized version of the document.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
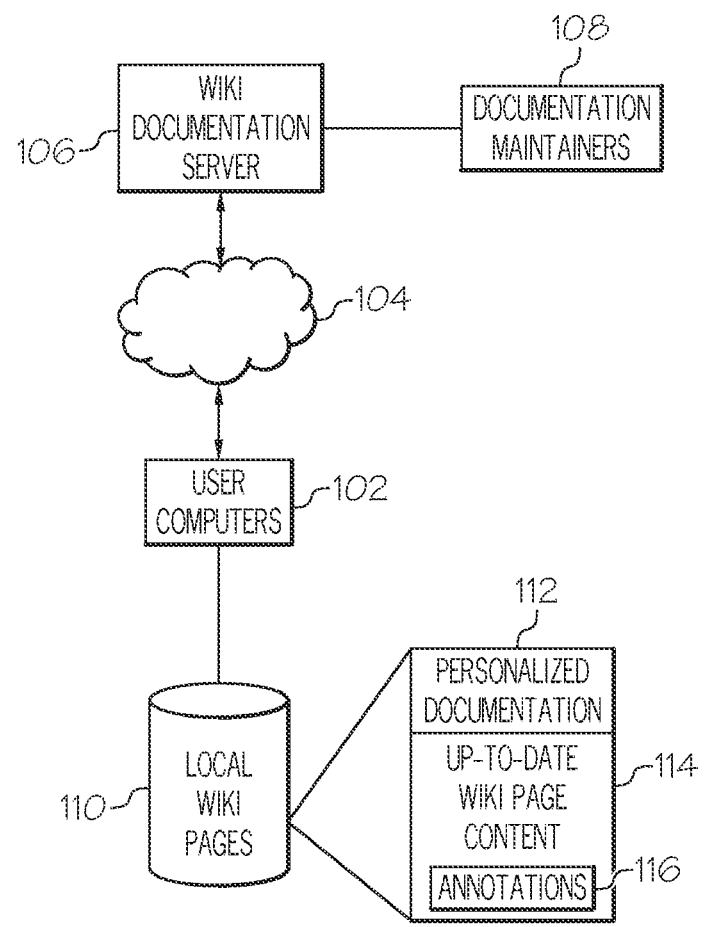
FIG. 1 illustrates an example computing environment in which customized documentation can be deployed in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates an example computing environment in which customized documentation can be deployed in accordance with the principles of the present disclosure. In FIG. 1, a wiki documentation server 106 includes a plurality of wiki documents that are maintained by one or more documentation maintainers 108. In an enterprise setting, for example, an organization may maintain a number of pages with documentation about installing, upgrading, configuring, using, and modifying software applications. The documentation maintainers 108 are personnel within the organization that are responsible for ensuring the content of the wiki documentation is current and reflects the most recent information available.

Various users within the organization, or possibly outside the organization, may utilize the information available on the wiki documentation server 106. A user will typically use a computer 102 to connect to the wiki documentation server 106 via a network 104 and access the different wiki pages or even store a local version of the wiki pages 110.

One downside to having locally stored wiki pages 110 is that they may become out of date and no longer contain the same information as the updated wiki pages on the documentation server 106.

Thus, wiki platforms typically provide subscription techniques wherein a user can subscribe to one or more wiki pages on the documentation server 106. The server 106 can include functionality that recognizes when a wiki page is updated and then identifies contact information for all subscribers to that page. The server 106 can inform a subscriber (e.g., via email, instant message, client/server application, etc.) that a page they subscribe to has been changed. Alternatively, the server 106 could push the changed wiki page to the user computer 102 of a subscriber where an application on the user computer 102 updates the local copy of that wiki page amongst the local wiki pages 110. One alternative technique that can be implemented from the user computer 102, is to use a client program that stores subscription information for a user to periodically poll all subscribed pages on the documentation server 106. Based on a timestamp that indicates when a wiki page was modified, the client application can determine whether or not to update any local wiki pages 110. The client application could even download the subscribed-to wiki page (regardless of any timestamp) and compare it with its corresponding locally stored wiki page. If there are any differences, then the local wiki pages 110 can be updated.

Regardless of the exact method by which the locally stored wiki pages are updated, the end result is that a copy of a wiki page in the local wiki pages 110 is made to conform to the copy of that wiki page as it is currently written on the documentation server 106.

Many users find it useful to add additional information to a wiki page to customize the documentation in a way that is most appropriate for their uses. However, when one of the local wiki pages 110 having this additional, customized information is conformed to the updated wiki page from the documentation server 106, the additional, customized information is lost. Thus, a user has the choice of out-of-date information that is customized; up-to-date information without any customization; or extra effort to restore the customized information each time the wiki page is updated.

In accordance with the principles of the present disclosure, however, a user can create and organize customized, or personalized, documentation 112 that includes both the up-to-date wiki page content 114 as well as annotations 116 that add custom information to the wiki page content 114.

In the discussion below, the wiki platform "Confluence" is sometimes referred to merely by way of example. One of ordinary skill will recognize that other wiki platforms having similar capabilities may be used without departing from the scope of the present disclosure. Accordingly, terms such as "wiki spaces", "macros", "macro output", "child pages", "parent pages", "export", etc. are not intended to be limited to only those specific functions of Confluence but are provided as concrete examples of conceptual elements useful in accordance with the principles of the present disclosure.

Figure 2:
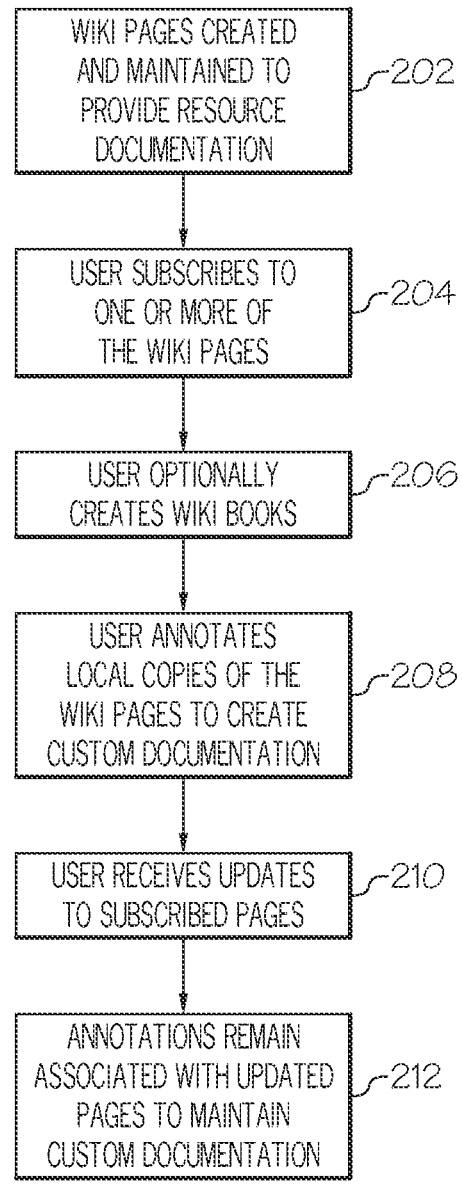
FIG. 2 illustrates a flowchart of an example method for assembling customized documentation in accordance with the principles of the present disclosure.

FIG. 2 illustrates a flowchart of an example method for assembling customized documentation in accordance with the principles of the present disclosure. In step 202, an organization creates and maintains one or more wiki pages in order to provide documentation of various resources of the organization. A user can subscribe/bookmark/tag one or more of these wiki pages, in step 204. As part of subscribing to the wiki pages, the user can also download copies of the wiki pages to be stored locally. The term "locally" is meant to distinguish different copies of a wiki page. For example, there can be one copy of the wiki page on the documentation server and then there can be a copy of this wiki page on a storage device local to the subscriber (i.e., user).

In step 206, the user can arrange the wiki pages into a wiki book. In particular, the wiki book can be a plurality of related wiki pages that the user arranges in a hierarchical manner that may not be the same as how they are arranged on the documentation server 106. In this way, the user can create a customized arrangement and view of a plurality of wiki pages or wiki space. The wiki book can be arranged so that a parent page can have various children pages that themselves may have their own children pages. The arrangement of the wiki pages into a wiki book, in this manner, does not interfere with the individual pages being updated.

Not only can the arrangement of various wiki pages be customized by a user creating one or more wiki books but, in step 208, the user can annotate a local copy of any wiki page to create custom or personalized documentation. For example, Confluence provides a menu item in its interface that allows the user can to select a wiki page and edit that wiki page. As part of the editing process, the user can select an interface widget to add a macro to the page. The macro is then run whenever the page is loaded by a browser. In particular, the user writes the user code of the macro to include a body of text, or images, of personalized documentation, or annotations, for that particular wiki page. Whenever any user with appropriate permission views the page, the macro output will be visible to that user within the context of the wiki page.

Next, in step 210, a user may receive notification that a wiki page has been updated or may receive a request for permission to automatically update the wiki page. In either case, the local copy of the wiki page is updated with new content from the documentation server.

In step 212, the annotations (e.g., the macro) are not part of the updated content but still remain associated with the locally stored copy of the wiki page. Accordingly, when the updated, locally stored wiki page is viewed a user will see the up-to-date content as well as the personalized annotation resulting from the macro.

According to the flowchart of FIG. 2, an original version of a wiki page is locally stored and annotations, such as a macro, are also locally stored which are associated with the original version of the wiki page. At some subsequent time a new version of the wiki page is received such as from a documentation server that has up-to-date content that is different than the original version of the wiki page. The locally stored original version of the wiki page is changed to a locally stored updated version based on differences between the original version and the received new version. However, the locally stored annotations are associated with the locally stored updated version just as they were associated with the locally stored original version of the wiki page. Together, the wiki page content of the updated version and the associated annotations combine to form a locally stored personalized version of the wiki page.

Figure 3:
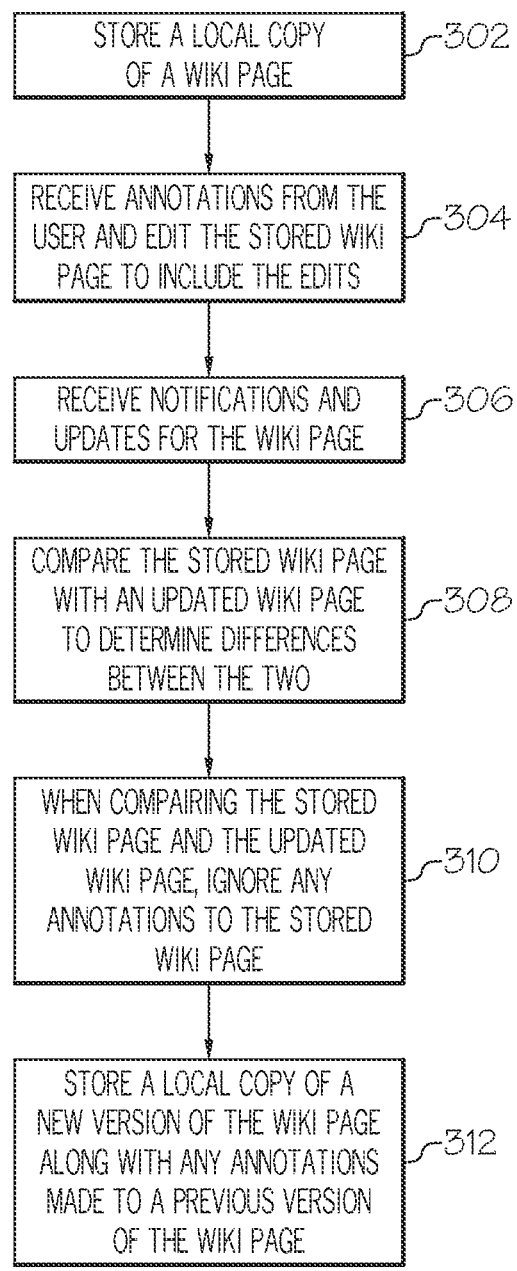
FIG. 3 illustrates a flowchart with additional details about the flowchart of FIG. 2.

FIG. 3 illustrates a flowchart with additional details about the flowchart of FIG. 2 from the perspective of a software application operating on a user's computer. In step 302 a local copy of a wiki page is stored. As described above, various other wiki pages could also be stored and arranged into customized wiki books.

In step 304, annotations are received from a user. The annotations may, for example, edit the wiki page to include a macro that is added to a wiki page to add additional, personalized documentation to the wiki page. The user may eventually, in step 306, receive a notification and/or updates for the wiki page. In step 308, the user's software can compare the stored version of the wiki page with the received updated version to determine differences between the two versions.

However, when comparing the two versions, the annotations made by the user to the stored version of the wiki page are ignored, in step 310. Thus, the content of the two versions of the wiki page are compared for differences but the lack of the annotations in the updated version is not considered to be a difference between the two documents. Thus, in step 312, a local copy of an updated version is stored along with any annotation made to a previously stored version of the wiki page.

As mentioned above, the annotation to a wiki page may be in the form of a macro that appears on a displayed wiki page as a note or other text. Thus, when such an annotated wiki page is exported (e.g., to pdf or Word) then the additional, personalized information in the annotation will appear on the exported version of the wiki page.

Figure 4:
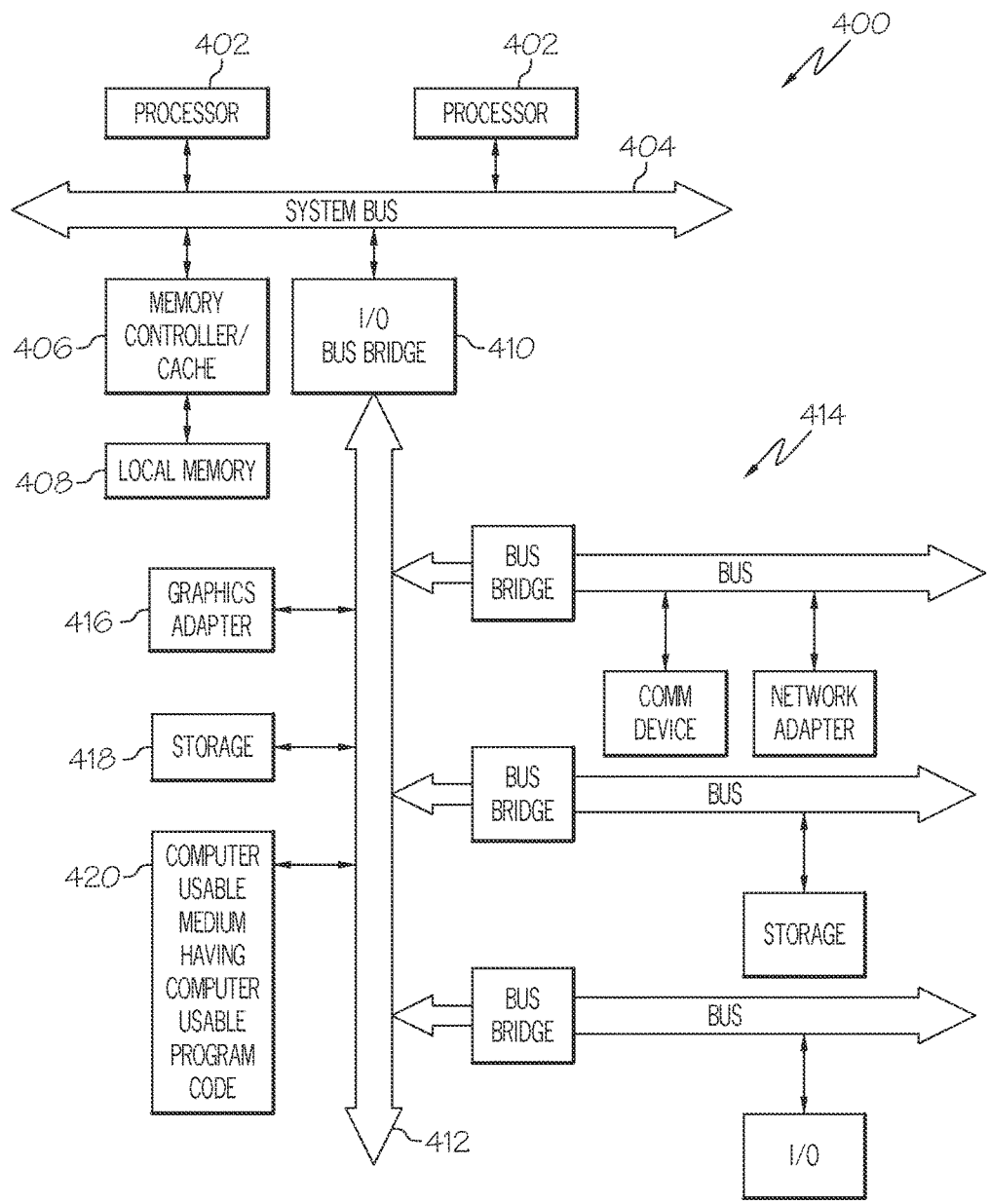
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 102 or aspects thereof, e.g., as set out in greater detail in FIG. 1-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method for assembling customized documentation, comprising:
storing, by a computer, annotations to an original version of a document, wherein the document comprises a wiki page;
receiving, by the computer, a notification that changes to the document have occurred: requesting, by the computer, a new version of the document;
receiving, by the computer, the new version of the document, wherein the new version of the document is different than the original version of the document;
determining, by the computer, differences between the new version of the document with the original version, wherein the annotations are ignored when determining the differences;
storing, by the computer, an updated version of the document based on the differences between the original version and the new version of the document; and
associating, by the computer, the annotations with the updated version of the document, wherein the annotations comprise a wiki formatting macro, and wherein the associated annotations and the updated version of the document form a personalized version of the document.

2. The method of claim 1, comprising: receiving, by the computer, the annotations from a first user.

3. The method of claim 2, wherein a second user, different than the first user, is responsible for changing the document.

4. The method of claim 2, comprising:
receiving, by the computer, a request from the first user to display the document; and based on the request, presenting, by the computer, the personalized version of the document to the first user.

5. The method of claim 2, comprising:
receiving, by the computer, a request from the first user to export the document; and based on the request, exporting, by the computer, the personalized version of the document.

6. The method of claim 1, wherein the document comprises a wikibook comprised of a plurality of hierarchically arranged wiki pages.

7. A system for assembling customized documentation, comprising:
a memory storage device;
a processor configured to execute instructions stored in the memory storage device, the instructions when executed by the processor cause the system to:
store annotations to an original version of a document, wherein the document comprises a wiki page;
receive a notification that changes to the document have occurred;
request a new version of the document;
receive the new version of the document, wherein the new version of the document is different than the original version of the document;
determine differences between the new version of the document with the original version, wherein the annotations are ignored when determining the differences;
store an updated version of the document based on the differences between the original version and the new version of the document; and
associate the annotations with the updated version of the document, wherein the annotations comprise a wiki formatting macro, and wherein the associated annotations and the updated version of the document form a personalized version of the document.

8. The system of claim 7, wherein the instructions, when executed by the processor, cause the system to:
receive the annotations from a first user.

9. The system of claim 8, wherein a second user, different than the first user, is responsible for changing the document.

10. The system of claim 8, wherein the instructions, when executed by the processor, cause the system to:
receive a request from the first user to display the document; and
based on the request, present the personalized version of the document to the first user.

11. The system of claim 8, wherein the instructions, when executed by the processor, cause the system to:
receive a request from the first user to export the document; and
based on the request, export the personalized version of the document.

12. The system of claim 7, wherein the document comprises a wiki-book comprised of a plurality of hierarchically arranged wiki pages.

13. A computer program product for assembling customized documentation, comprising:
a non-transitory computer readable storage medium having computer readable program code embodied therewith, the computer readable program code comprising:
computer readable program code for storing annotations to an original version of a document, wherein the document comprises a wiki page;
computer readable program code for receiving a notification that changes to the document have occurred;
computer readable program code for requesting a new version of the document: computer readable program code for receiving the new version of the document, wherein the new version of the document is different than the original version of the document;
computer readable program code for determining differences between the new version of the document and the original version, wherein the annotations are ignored when determining the differences;
computer readable program code for storing an updated version of the document based on the differences between the original version and the new version of the document; and
computer readable program code for associating the annotations with the updated version of the document, wherein the annotations comprise a wiki formatting macro, and wherein the associated annotations and the updated version of the document form a personalized version of the document.

* * * * *